(12) United States Patent
Yamaguchi et al.

(10) Patent No.: US 10,684,302 B2
(45) Date of Patent: Jun. 16, 2020

(54) SPECIMEN INSPECTION AUTOMATION SYSTEM

(71) Applicant: HITACHI HIGH-TECHNOLOGIES CORPORATION, Tokyo (JP)

(72) Inventors: Shigeki Yamaguchi, Tokyo (JP); Shigeru Yano, Tokyo (JP); Toshiki Yamagata, Tokyo (JP); Hiroki Ihara, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 175 days.

(21) Appl. No.: 15/758,355

(22) PCT Filed: Aug. 19, 2016

(86) PCT No.: PCT/JP2016/074238
§ 371 (c)(1),
(2) Date: Mar. 8, 2018

(87) PCT Pub. No.: WO2017/051642
PCT Pub. Date: Mar. 30, 2017

(65) Prior Publication Data
US 2018/0246131 A1 Aug. 30, 2018

(30) Foreign Application Priority Data
Sep. 25, 2015 (JP) ................ 2015-188480

(51) Int. Cl.
*G01N 35/04* (2006.01)
*G01N 35/02* (2006.01)
*G01N 35/00* (2006.01)

(52) U.S. Cl.
CPC ....... *G01N 35/04* (2013.01); *G01N 35/00584* (2013.01); *G01N 35/02* (2013.01);
(Continued)

(58) Field of Classification Search
CPC .. G01N 35/02; G01N 35/04; G01N 35/00584; G01N 35/0092; G01N 2035/0462; G01N 2035/0465
See application file for complete search history.

(56) References Cited

U.S. PATENT DOCUMENTS

| 4,798,095 A | 1/1989 | Itoh |
| 2013/0197690 A1 | 8/2013 | Suzuki et al. |

(Continued)

FOREIGN PATENT DOCUMENTS

| CN | 103733073 A | 4/2014 |
| CN | 104583778 A | 4/2015 |

(Continued)

OTHER PUBLICATIONS

International Search Report of PCT/JP2016/074238 dated Nov. 8, 2016.

(Continued)

*Primary Examiner* — Paul M. West
(74) *Attorney, Agent, or Firm* — Mattingly & Malur, PC

(57) ABSTRACT

This specimen inspection automation system is provided with: a processing unit which processes a specimen; a conveying line which conveys carriers; a control device which controls the conveying of the carriers; and external connection modules which deliver the carriers to and from external devices. The control device controls the number of carriers in the specimen inspection automation system within a fixed range on the basis of the number of carriers conveyed into and out of the system by the external connection modules.

8 Claims, 11 Drawing Sheets

(52) U.S. Cl.
CPC ... *G01N 35/0092* (2013.01); *G01N 35/00603* (2013.01); *G01N 2035/0462* (2013.01); *G01N 2035/0465* (2013.01)

(56) References Cited

U.S. PATENT DOCUMENTS

| | | |
|---|---|---|
| 2014/0208872 A1 | 7/2014 | Yasuzawa et al. |
| 2015/0177268 A1 | 6/2015 | Reisch et al. |
| 2016/0202279 A1 | 7/2016 | Endo et al. |
| 2016/0244269 A1 | 8/2016 | Akutsu |

FOREIGN PATENT DOCUMENTS

| | | |
|---|---|---|
| EP | 2 896 965 A1 | 7/2015 |
| EP | 2 887 071 B1 | 12/2018 |
| JP | 2002-357612 A | 12/2002 |
| WO | 2012043261 A1 | 4/2012 |
| WO | 2013/042549 A1 | 3/2013 |
| WO | 2015/064540 A1 | 5/2015 |

OTHER PUBLICATIONS

Extended European Search Report received in corresponding European Application No. 16848430.1 dated Apr. 30, 2019.
Chinese Office Action received in corresponding Chinese Application No. 2016800541635 dated Mar. 30, 2020.

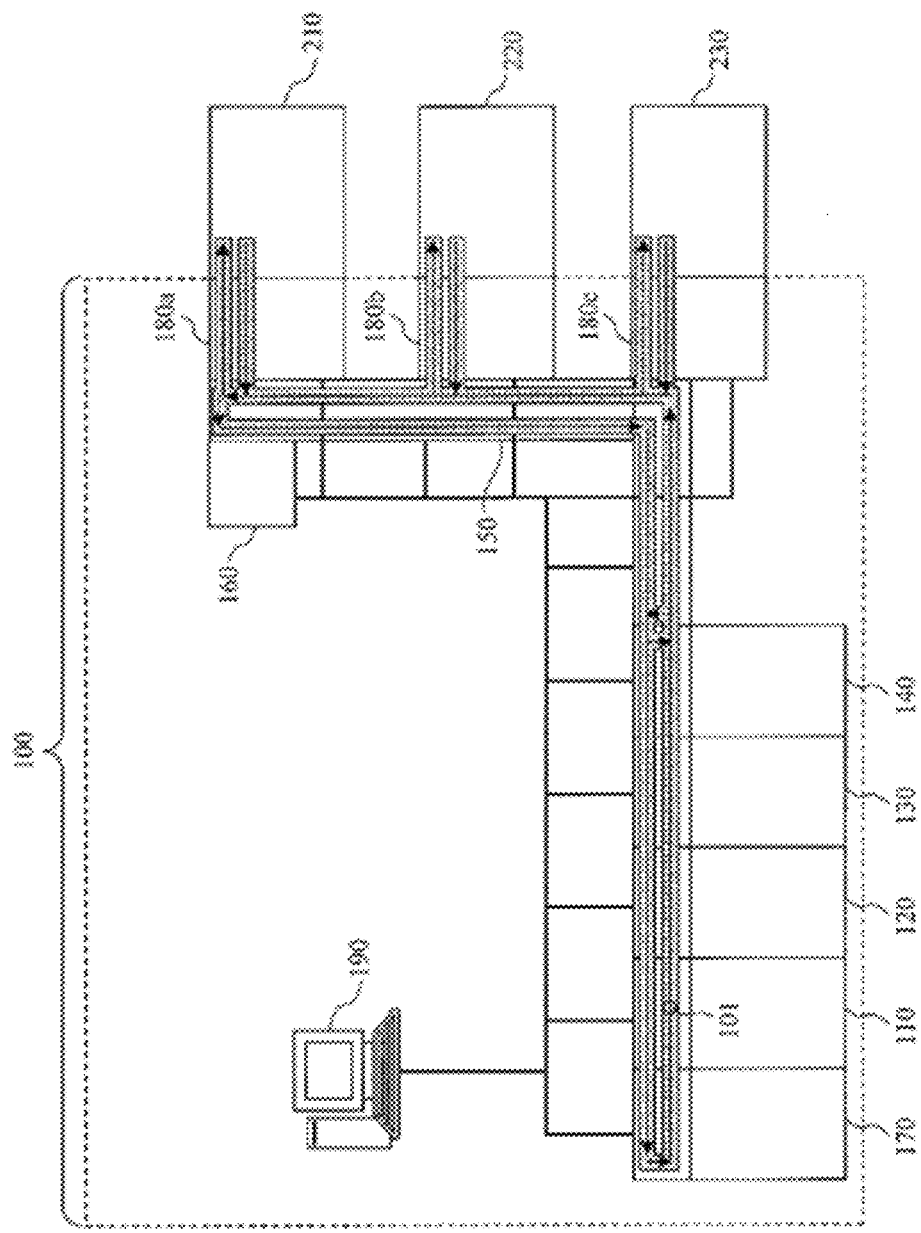
[Fig. 1]

[Fig. 2]
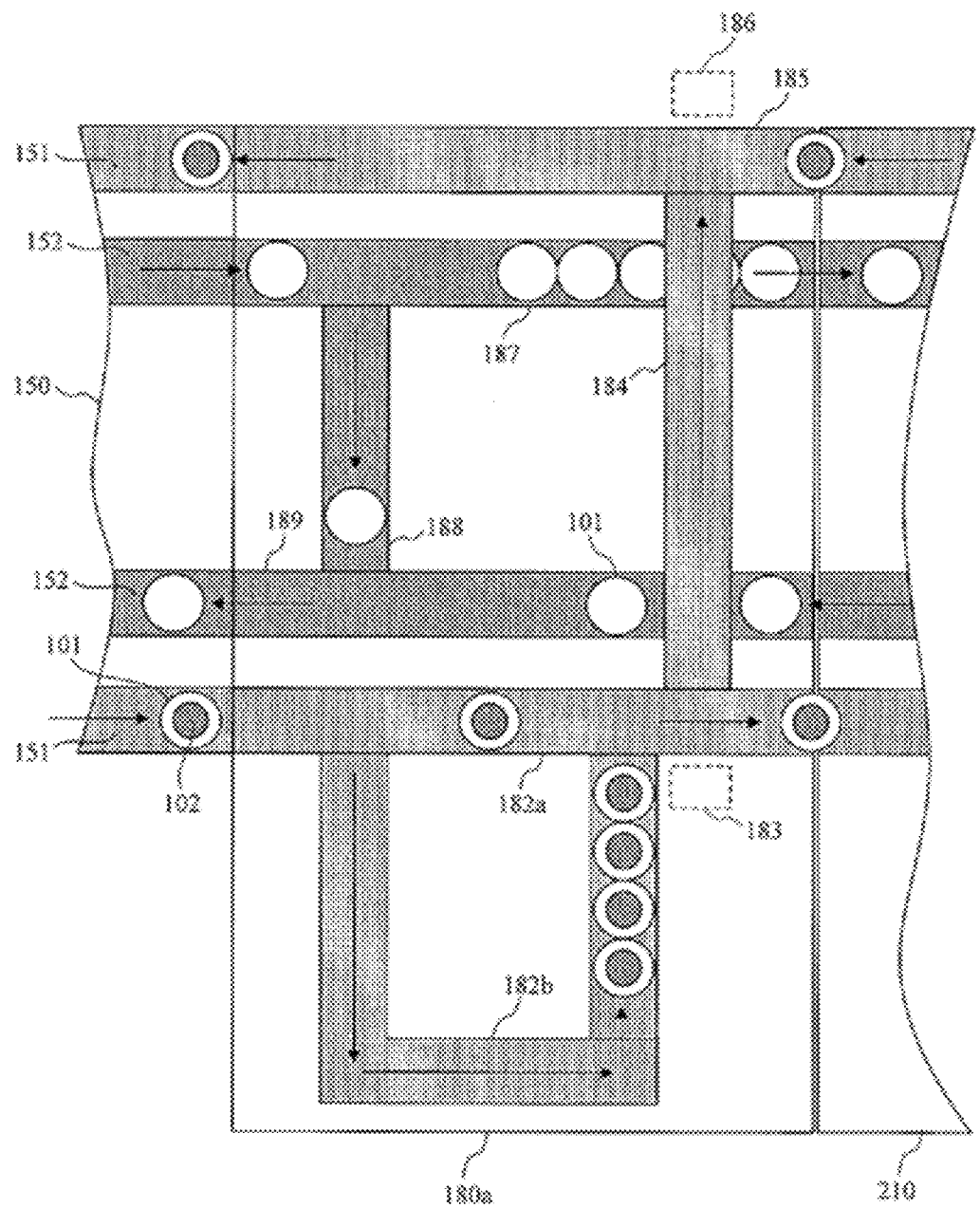

[Fig. 3]
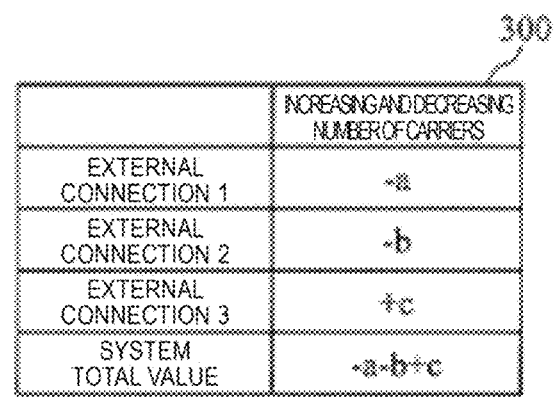

[Fig. 4]

| | CARRIER CONVEY-IN WARNING THRESHOLD VALUE 401 | CARRIER CONVEY-IN INTERRUPTION THRESHOLD VALUE 402 | CARRIER CONVEY-OUT WARNING THRESHOLD VALUE 403 | CARRIER CONVEY-OUT INTERRUPTION THRESHOLD VALUE 404 | PRIORITY ORDER 405 |
|---|---|---|---|---|---|
| EXTERNAL CONNECTION 1 | 10 | 15 | -5 | -10 | 2 |
| EXTERNAL CONNECTION 2 | 10 | 15 | -10 | -15 | 1 |
| EXTERNAL CONNECTION 3 | 10 | 15 | -10 | -15 | 2 |
| SYSTEM TOTAL VALUE | 20 | 30 | -20 | -30 | - |

[Fig. 5]
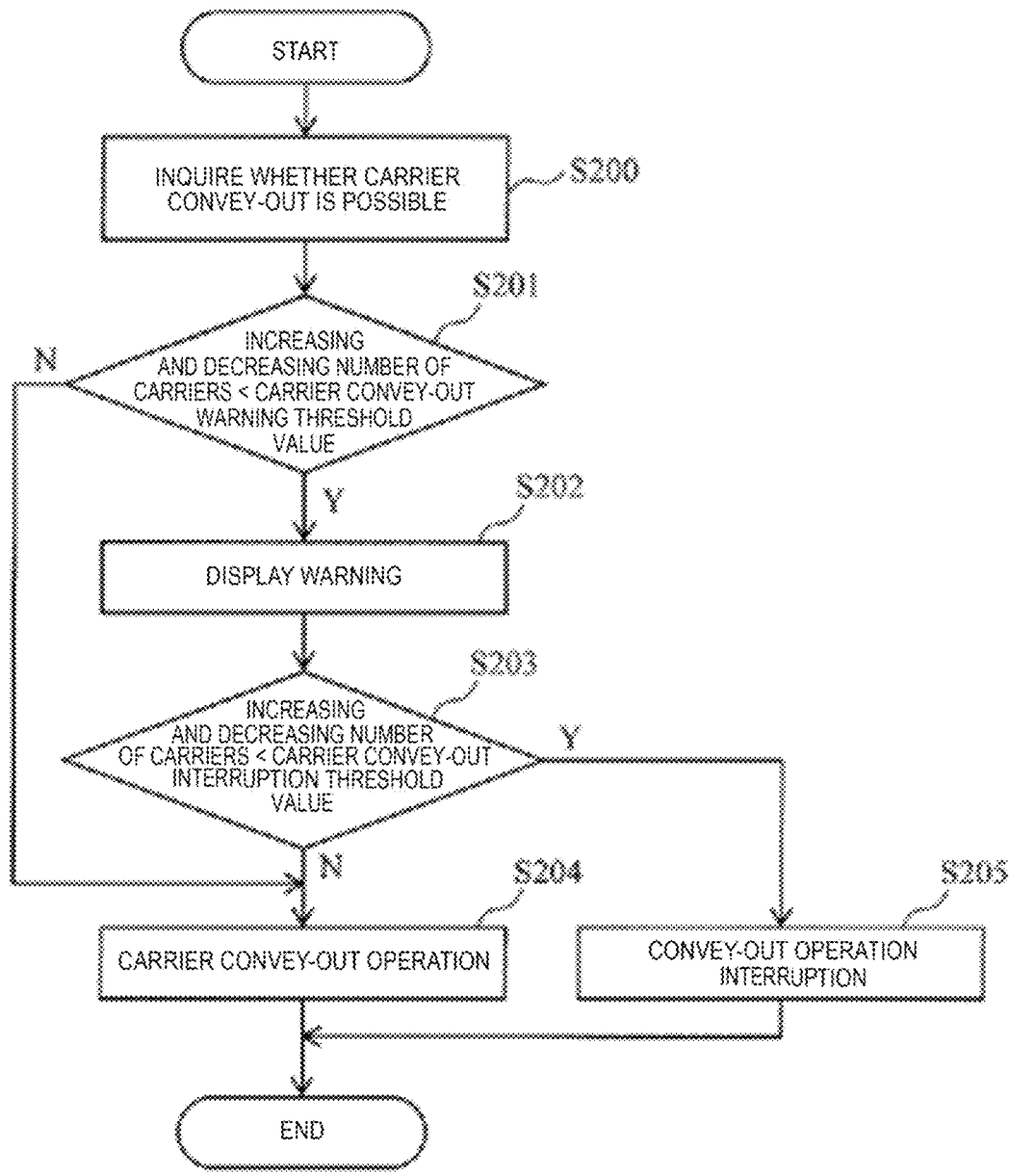

[Fig. 6]
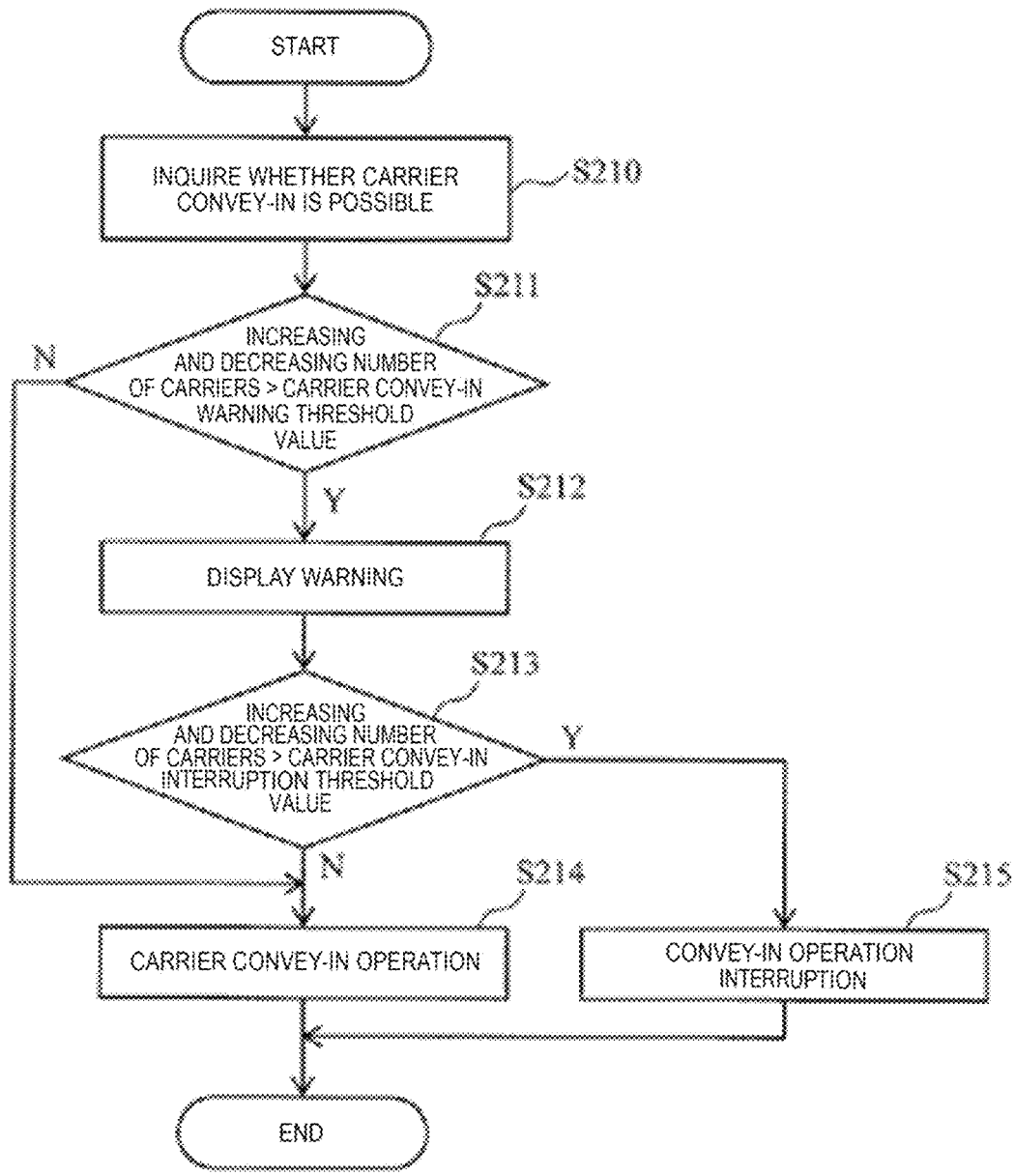

[Fig. 7]
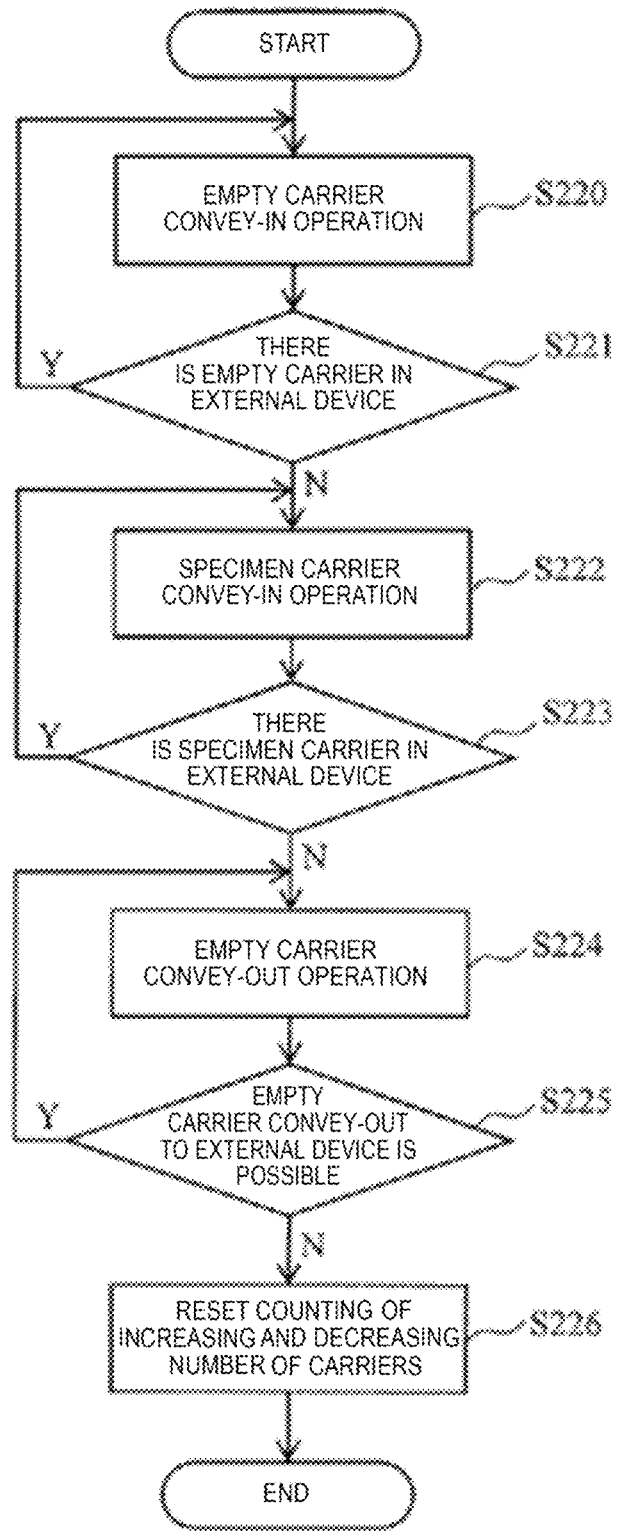

[Fig. 8]
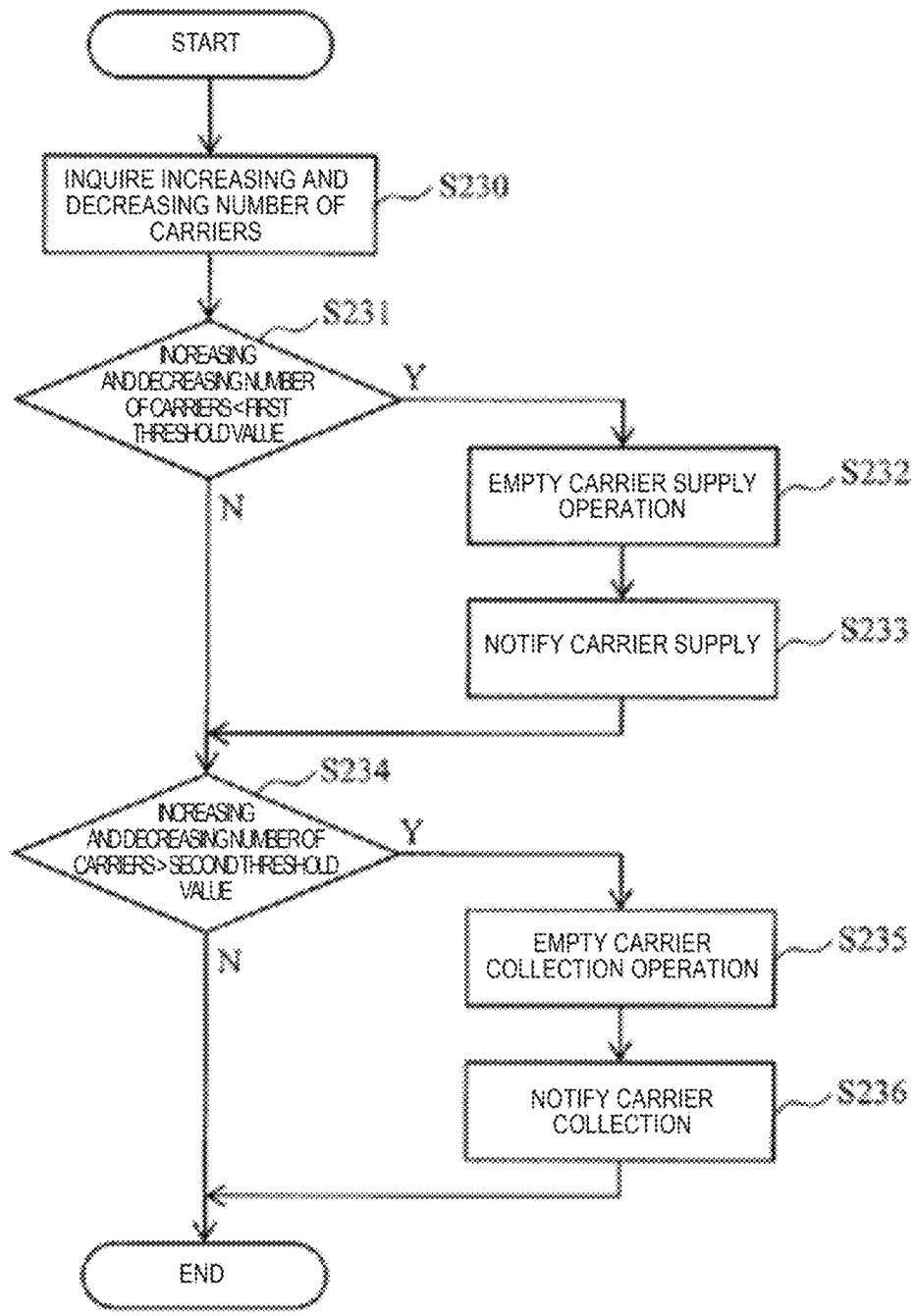

[Fig. 9]
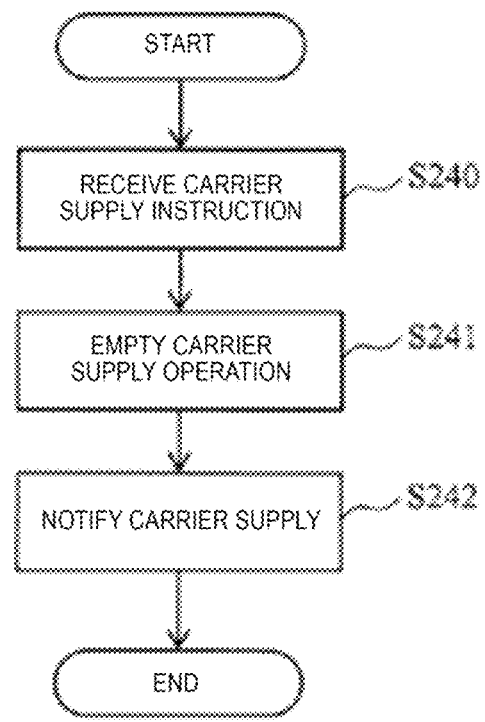

[Fig. 10]
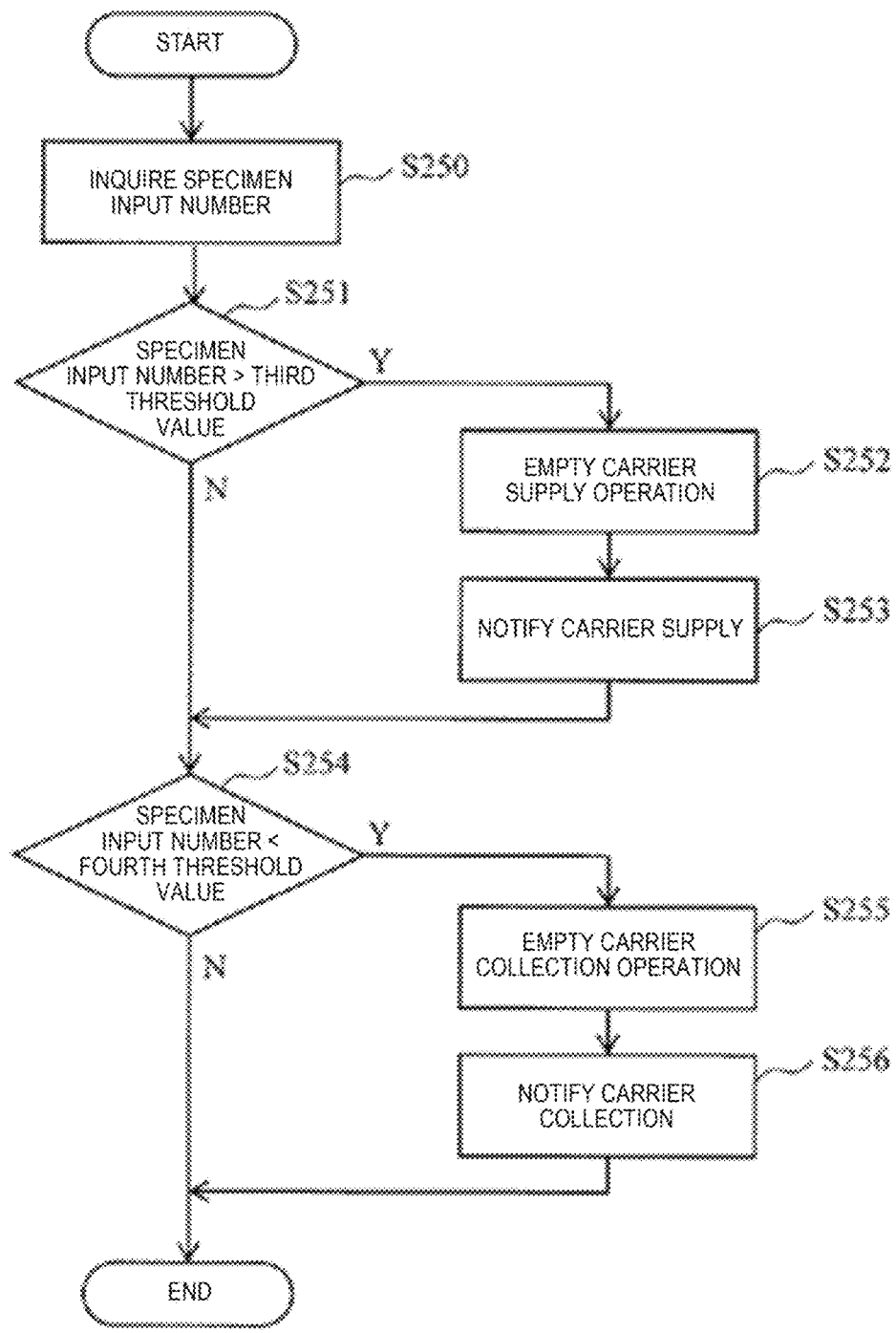

[Fig. 11]
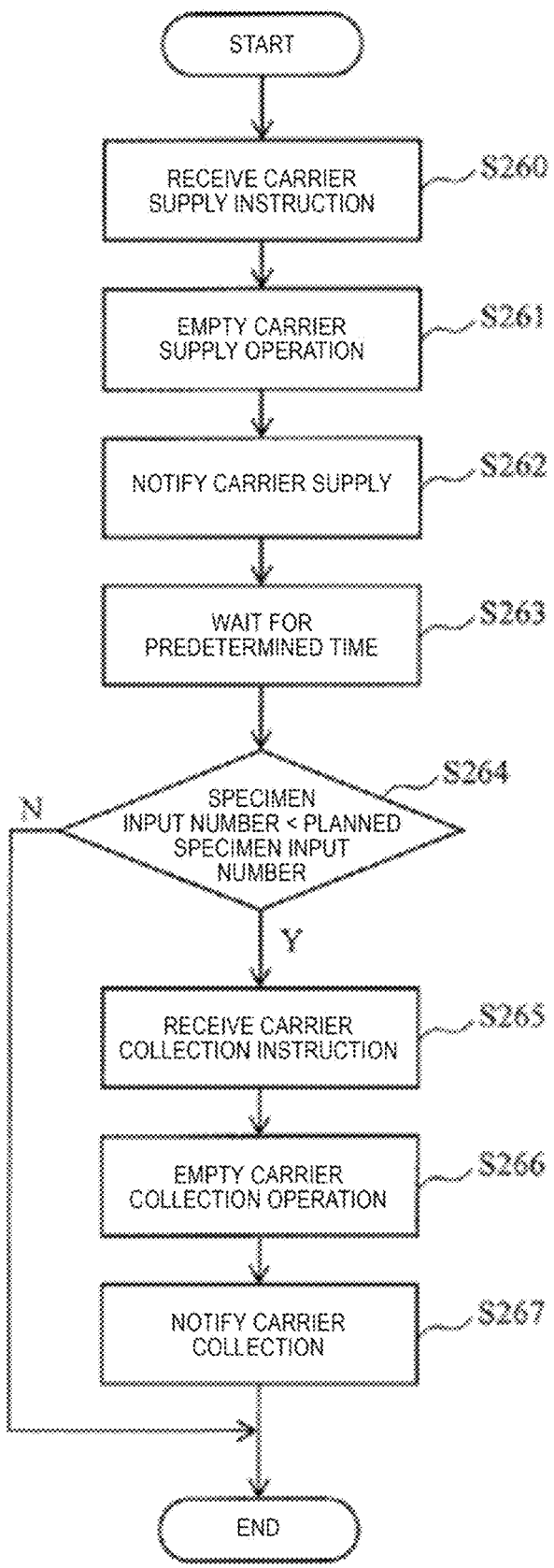

SPECIMEN INSPECTION AUTOMATION SYSTEM

TECHNICAL FIELD

The present invention relates to a specimen inspection automation system.

BACKGROUND ART

In recent years, with the introduction of various types of automated equipment in the medical field, labor saving of inspection work has been processed. In hospital examination, hospitalized patient's and outpatient's examination specimens are gathered in each department in the hospital and processed collectively in the laboratory. The inspection items for each specimen are conveyed from the doctor to the inspection room using an online information processing system, and the inspection result is reported online from the examination room to the doctor.

Preprocessing, such as centrifugation, unplugging, dispensing and the like are performed with respect to most of the specimens to be inspected, such as blood and urine, and the preprocessing time accounts for a large proportion of the total inspection work time.

As described above, there are several processing in the preprocessing of the inspection process, but the content of the preprocessing differs depending on the target inspection type, for example, the urine inspection does not require centrifugation. With respect to the inspection target type specimen that requires to be centrifuged, after the centrifugation is performed, the unplugging and the dispensing are performed. The dispensing is processing for creating a child specimen from a parent specimen. For example, a plurality of child specimens obtained by the dispensing can be simultaneously conveyed to a plurality of analyzers connected to the system online. In addition, the dispensing also causes the child specimen to be conveyed with the child specimen having the same barcode as that of the parent specimen out to a sorting tray in order to perform inspection with an off-line analyzer which is not connected to the system. The specimen to which all of the processing processes have been completed is accommodated in a storage module.

The specimen inspection automation systems are generally introduced in facilities with a relatively large scale, and usually hundreds to thousands of specimens are processed in one day. In addition, in large facilities, in order to perform various inspections, such as biochemical inspection, immunological inspection, coagulation inspection, and hematology inspection, a plurality of specimens are collected from one patient. Therefore, specimen carriers for carrying specimens inside the specimen inspection automation system need to be prepared the corresponding number in order to perform the above-described processing smoothly.

In PTL 1, disclosed is a specimen inspection automation system which includes a plurality of loop conveying paths for conveying an empty holder and is capable of supplying the empty holder without delay.

CITATION LIST

Patent Literature

PTL 1: International Publication No. 2013/042549

SUMMARY OF INVENTION

Technical Problem

In the system of PTL 1, by providing a plurality of loop conveying paths, the supply time of the empty holder is shortened. In addition, in the system of PTL 1, a depletion detection sensor is provided, and the number of holders in the loop conveying path is maintained within an appropriate range.

However, PTL 1 only describes a method of managing the number of carriers in the system, and does not describe about managing the number of carriers with an external device (analyzer). In the related art, in a case of exchanging carriers by connecting the system and an external device to each other, there is a concern that the carrier is biased toward the inside of the system or the external device. In a case where the carrier exists being biased to the inside of the system or the external device, there is a concern that the supply to a necessary part of the empty carrier may be stagnant, and the processing speed of the system decreases. In addition, congestion may occur due to concentration of carriers at a specific site, and there is a concern that the processing speed of the system decreases.

Here, the present invention provides a specimen inspection automation system which is capable of managing the number of carriers with an external device.

Solution to Problem

For example, in order to solve the above problem, a configuration described in the claims is adopted. The present invention includes a plurality of means for solving the above-described problems, but for example, there is provided a specimen inspection automation system including: a processing unit which processes a specimen; a conveying line which conveys a carrier; a control device which controls the conveying of the carrier; and an external connecting module which delivers the carrier to and from the external device. The carrier includes a specimen carrier on which the specimen is mounted and an empty carrier. In the specimen inspection automation system, the control device controls the number of carriers in the specimen inspection automation system to a certain range based on the number of times of convey-in and convey-out of carriers in the external connecting module.

Advantageous Effects of Invention

According to the specimen inspection automation system of the present invention, it is possible to manage the number of carriers with the external device. Further features related to the present invention will become apparent from the description of the specification and the attached drawings. In addition, the problems, configurations, and effects other than those described above will be clarified by the description of the following embodiments.

BRIEF DESCRIPTION OF DRAWINGS

FIG. 1 is an entire overview of a specimen inspection automation system in an embodiment of the present invention.

FIG. 2 is an enlarged view of a connection position between the specimen inspection automation system and an external device.

FIG. 3 is an example of a carrier increase and decrease table managed by a host computer.

FIG. 4 is an example of a threshold value table managed by the host computer.

FIG. 5 is an example of an operation flow of a carrier convey-out from an external connecting module to the external device.

FIG. 6 is an example of an operation flow of carrier convey-in from the external device to the external connecting module.

FIG. 7 is an example of a flow of a reset operation of the specimen inspection automation system.

FIG. 8 is an example of a flow of an operation for compensating for an increase or decrease in number of carriers.

FIG. 9 is an example of a flow of an empty carrier supply operation at the time of a re-inspection request.

FIG. 10 is an example of a flow of an empty carrier supply operation at the time of a specimen input.

FIG. 11 is an example of a flow of an on-time supply operation of carriers.

DESCRIPTION OF EMBODIMENTS

Hereinafter, embodiments of the present invention will be described with reference to the attached drawings. The attached drawings illustrate specific embodiments consistent with the principles of the present invention, but the embodiments are for understanding the present invention and are not used for interpretation as limiting the present invention in any way.

The following embodiments relate to a specimen inspection automation system, in particular, a specimen inspection automation system which processes the clinical inspection of multiple patient specimens.

FIG. 1 is an entire overview of an embodiment of a specimen inspection automation system. A specimen inspection automation system 100 includes a specimen input module 110, a centrifugal module 120, an unplugging module 130, a dispensing module 140, a conveying line 150, a carrier buffer module 160, a storage module 170, external connecting modules 180a, 180b, and 180c, and a host computer (control device) 190. Hereinafter, there is also a case where the centrifugal module 120, the unplugging module 130, and the dispensing module 140 are simply referred to as "processing units".

In FIG. 1, configuration elements of the specimen inspection automation system 100 are ranges surrounded by a dotted line. In the example, the specimen inspection automation system 100 is connected to three external devices 210, 220, and 230. FIG. 2 is an enlarged view of a connection position between the specimen inspection automation system and the external device.

The specimen input module 110 includes a mechanism for inputting a specimen from the outside and serves as an entrance to the specimen in the specimen inspection automation system 100. In the specimen input module 110, when an operator sets a specimen tray (not illustrated) on which a specimen container 102 (refer to FIG. 2) is installed, the specimen input module 110 replaces the specimen container 102 from the specimen tray to the carrier 101. Accordingly, the carrier 101 on which the specimen container 102 is mounted is conveyed on the conveying line 150.

In addition, the specimen input module 110 may include a sensor for reading a barcode of the specimen container 102 and a barcode of the carrier 101. The sensor recognizes the specimen ID and the carrier ID from the barcode, and transmits the specimen ID and the carrier ID to the host computer 190. The host computer 190 associates and manages the specimen ID and the carrier ID.

In addition, in the present embodiment, the carrier 101 is configured to mount one specimen container 102 thereon, but the number of specimen containers 102 mounted on the carrier 101 is not limited to one. The carrier 101 may mount the plurality of specimen containers 102 (for example, five specimen containers) thereon.

The centrifugal module 120 includes a mechanism for performing centrifugation with respect to the specimen. In the centrifugal module 120, the centrifugation is performed with respect to the specimen that requires centrifugation.

The unplugging module 130 includes a mechanism for removing a stopper of the specimen container 102. By the unplugging, the specimen container 102 is in a state where the processing by the dispensing module 140 after this is possible, or in a state where the processing by the external device (for example, an automatic analyzer) is possible.

The dispensing module 140 includes a mechanism for dispensing from the unplugged specimen container 102 to the plurality of containers. By the dispensing module 140, the specimen of the specimen container 102 may be divided into the plurality of containers. In addition, the dispensing module 140 may include a barcode sticking module for sticking the barcode to the plurality of containers after the dispensing. In addition, the plurality of containers after the dispensing are mounted on the carrier 101.

The conveying line 150 includes a mechanism for conveying the carrier 101. In the following description, as illustrated in FIG. 2, the carrier 101 on which the specimen container 102 is mounted is referred to as "specimen carrier", and the carrier 101 on which the specimen container 102 is not mounted is referred to as "empty carrier".

The conveying line 150 includes at least one loop conveying path. In the present embodiment, the conveying line 150 includes a specimen conveying line 151 for conveying the specimen carrier 101, and an empty carrier conveying line 152 for conveying the empty carrier 101. The specimen conveying line 151 and the empty carrier conveying line 152 are loop type conveying paths, respectively, and are configured with a known conveying mechanism (for example, a belt conveyor).

The specimen conveying line 151 is connected to each of the modules 110, 120, 130, 140, and 170, and sequentially conveys the specimen carrier 101 on which the specimen container 102 is mounted to the next process.

The empty carrier conveying line 152 is connected to a device including a mechanism for mounting the specimen container 102 on the empty carrier 101 and a device including a mechanism for extracting the specimen container 102 from the specimen carrier 101. The empty carrier conveying line 152 supplies the empty carrier 101 to a device (for example, the external device 210) including a mechanism for mounting the specimen container 102 on the empty carrier 101. In addition, the empty carrier conveying line 152 collects the empty carrier 101 to a device (for example, the external device 210) including a mechanism for extracting the specimen container 102 on the specimen carrier 101. The collected empty carrier 101 is conveyed to an empty carrier supply unit (not illustrated) and reused.

The carrier buffer module 160 is a module for storing the empty carrier 101. The carrier buffer module 160 is configured to set the number of empty carriers 101 in the specimen inspection automation system 100 within a predetermined range. Here, the predetermined range means a range in which the number of carriers 101 conveyed in and out in the external devices 210, 220, and 230 does not deviate, or a range in which a difference between the specimen input number in the processing unit and the number of empty carriers 101 on the empty carrier conveying line 152 is smaller than a certain value.

For example, in a case where the number of empty carriers 101 in the specimen inspection automation system 100 decreases, the carrier buffer module 160 supplies the empty carrier 101 to the empty carrier conveying line 152. Meanwhile, in a case where the number of empty carriers 101 in the specimen inspection automation system 100 increases, the carrier buffer module 160 collects the empty carrier 101 to the empty carrier conveying line 152.

The storage module 170 is a module that stores the specimen container 102 therein. The storage module 170 may extract the specimen container 102 from the specimen carrier 101 returned by the specimen conveying line 151 and classify and store the specimen container 102 as a specimen tray for each purpose. In addition, in a case of conducting re-inspection of specimen, the storage module 170 replaces the specimen container 102 from the specimen tray to the specimen carrier 101, and puts the specimen carrier 101 on the specimen conveying line 151.

The external connecting modules 180a, 180b, and 180c are disposed between the specimen inspection automation system 100 and the external devices 210, 220, and 230, respectively. The external connecting modules 180a, 180b, and 180c are configured to deliver the carrier 101 to and from the external devices 210, 220, and 230. In addition, the external connecting modules 180a, 180b, and 180c detect the specimen carrier 101 and the empty carrier 101 which are conveyed out to the external devices 210, 220, and 230, and detect the specimen carrier 101 and the empty carrier 101 which are conveyed in from the external devices 210, 220, and 230. In addition, in the following description, a case where the carrier 101 is conveyed from the specimen inspection automation system 100 to the external devices 210, 220, and 230 is expressed as "convey-out", and a case where the carrier 101 is conveyed from the external device 210, 220, and 230 to the specimen inspection automation system 100 is expressed as "convey-in".

The host computer 190 controls the configuration elements of the specimen inspection automation system 100. The target range of control by the host computer 190 is, for example, within a frame of the dotted line in FIG. 1. The host computer 190 may include a central processing device, an auxiliary storage device, and a main storage device. For example, the central processing device is configured with a processor, such as a central processing unit (CPU). For example, the auxiliary storage device is a hard disk, and the main storage device is a memory. The control processing performed by the host computer 190 may be realized by storing program codes that correspond to the processing in a storage device, such as a memory, and by executing each of the program codes by the processor.

In addition, the host computer 190 may include a display unit and an input unit. The input unit is a keyboard, a pointing device (mouse or the like) or the like. The display unit is a display, a printer, or the like. The operator may make various settings of the specimen inspection automation system 100 using the input unit. In addition, the operator may confirm the setting contents of the specimen inspection automation system 100 by the display unit.

As a feature of the embodiment, the host computer 190 controls the conveying of the carrier 101. Specifically, the host computer 190 controls the number of carriers 101 in the specimen inspection automation system 100 within a certain range based on the number of carriers 101 conveyed in and out in the external connecting modules 180a, 180b, and 180c.

The external device 210 is a specimen stocker for storing specimen. The external device 210 extracts the specimen container 102 mounted on the specimen carrier 101, and refrigerates and stores the specimen container 102 on the inside of the device. In addition, the external device 210 can reload the specimen container 102 stored in the device to the empty carrier 101.

The external device 220 is an automatic analyzer which performs various types of analysis processing with respect to the specimen. As an example, an automatic analyzer is a device which analyzes specimen components, such as blood and urine.

The external device 230 is a specimen aligning and inputting device that aligns the posture of the specimen container 102 which is randomly input, and mounts the specimen container 102 onto the specimen carrier 101.

In the present embodiment, the specimen container 102 into which the specimen is input is taken into the system in the specimen input module 110, and is mounted on the specimen carrier 101. After this, the specimen carrier 101 on which the specimen container 102 is mounted is conveyed to the centrifugal module 120, the unplugging module 130, and the dispensing module 140 by the conveying line 150 as necessary. After this, the specimen carrier 101 on which the specimen container 102 is mounted may be conveyed to a specific device among the external devices 210, 220, and 230. For example, the specimen carrier 101 on which the specimen container 102 is mounted is conveyed to the external device 220 for analysis processing. After the above-described various types of processing are performed, the specimen carrier 101 is conveyed to the storage module 170.

In the embodiment, the external devices 210, 220, and 230 are described as external devices of the specimen inspection automation system 100, that is, devices other than information management by the host computer 190, but combinations which are not limited thereto are also possible. As an example, it is also possible to configure the specimen input module 110, the centrifugal module 120, the unplugging module 130, the dispensing module 140, and the storage module 170 which are described as devices on the inside of the system as external devices. In addition, it is also possible to configure devices, such as a specimen stocker, an automatic analyzer, or a specimen aligning and inputting device as internal devices.

Next, the configuration of the external connecting module and the control of the host computer 190 will be described by using FIG. 2. Although FIG. 2 illustrates the external connecting module 180a between the specimen inspection automation system 100 and the external device 210, the other external connecting modules 180b and 180c may have similar configurations.

In the example of FIG. 2, the specimen carrier 101 on which the specimen container 102 is mounted is conveyed out to the specimen inspection automation system 100 via the external connecting module 180a, and the empty carrier 101 from which the specimen container 102 has been extracted is conveyed into the specimen inspection automation system 100 via the external connecting module 180a. In addition, the empty carrier 101 is conveyed out to the specimen inspection automation system 100 via the external connecting module 180a, and the specimen carrier 101 on which the specimen container 102 is mounted is conveyed into the specimen inspection automation system 100 via the external connecting module 180a.

First, a case where the specimen carrier 101 is conveyed out from the specimen inspection automation system 100 to the external device 210 via the external connecting module 180a will be described. A specimen carrier convey-out line 182a receives the specimen carrier 101 from the upstream specimen conveying line 151. The specimen carrier convey-out line 182a includes a buffer line 182b. In a case where the specimen in the specimen container 102 is "normal specimen", the specimen carrier 101 is conveyed to a barcode reading position (not illustrated) of the specimen carrier convey-out line 182a via the buffer line 182b. In addition, the specimen carrier 101 on which the specimen container 102 of a normal specimen is mounted may be allowed to wait for a certain period of time at the buffer line 182b. In a case where the specimen in the specimen container 102 is "urgent specimen", the specimen carrier 101 goes straight at the specimen carrier convey-out line 182a not passing through the buffer line 182b, and is conveyed to the barcode reading position. Accordingly, it is possible to preferentially convey the emergency specimen out to the external device 210.

The specimen carrier convey-out line 182a includes a sensor 183 in the vicinity of the barcode reading position. For example, a barcode is attached to each of the specimen container 102 and the carrier 101. In addition, the object attached to the specimen container 102 and the carrier 101 is not limited to the barcode, but other tags or the like may be used as long as it is possible to identify a carrier ID and a specimen ID.

The sensor 183 reads the carrier ID and the specimen ID from the barcode. The external connecting module 180a transmits the information of the carrier ID and the specimen ID to the host computer 190. The host computer 190 compares a set of the received carrier ID and specimen ID information with a set of preliminarily managed carrier ID and specimen ID to determine whether the specimen carrier 101 should be conveyed out to the external device 210. The host computer 190 transmits the determination result to the external connecting module 180a. The external connecting module 180a conveys the specimen carrier 101 out to the external device 210 in a case where the specimen carrier 101 is to be conveyed out to the external device 210. At this time, the external connecting module 180a notifies the host computer 190 that the specimen carrier 101 has been conveyed out to the external device 210. The host computer 190 can update the increasing and decreasing number of carriers using the notification information. In addition, in a case where any error occurs (for example, a barcode reading error or a case where the specimen carrier 101 is not to be conveyed out to the external device 210), the external connecting module 180a returns to the specimen conveying line 151 on the downstream side via a relay line 184 and a specimen carrier convey-in line 185 considering the specimen carrier 101 as an error specimen. The error specimen is conveyed to an error specimen buffer (not illustrated).

Next, a case where the specimen carrier 101 is conveyed into the specimen inspection automation system 100 from the external device 210 via the external connecting module 180a will be described. The specimen carrier convey-in line 185 receives the specimen carrier 101 from the external device 210. The specimen carrier convey-in line 185 includes a sensor 186 in the vicinity of the predetermined barcode reading position. The sensor 186 reads the carrier ID and the specimen ID from the barcode of the specimen container 102 and the carrier 101. The external connecting module 180a transmits the information of the carrier ID and the specimen ID to the host computer 190. The host computer 190 associates and manages the specimen ID and the carrier ID. In addition, at this time, the external connecting module 180a notifies the host computer 190 that the specimen carrier 101 has been conveyed into the external device 210. The host computer 190 can update the increasing and decreasing number of carriers using the notification information. In addition, in a case where any error occurs (for example, a barcode reading error or a case where the specimen ID and the carrier ID are not registered in the host computer 190), the external connecting module 180a returns to the specimen conveying line 151 on the downstream side via the specimen carrier convey-in line 185 considering the specimen carrier 101 as an error specimen. The error specimen is conveyed to an error specimen buffer (not illustrated).

Next, a case where the empty carrier 101 is conveyed out from the specimen inspection automation system 100 to the external device 210 via the external connecting module 180a will be described. An empty carrier convey-out line 187 receives the empty carrier 101 from the empty carrier conveying line 152. Similar to the specimen carrier convey-out line 182a, the empty carrier convey-out line 187 has a buffer line (not shown). The buffer line is a line which is capable of keeping the empty carrier 101 for a certain period of time. For example, the empty carrier convey-out line 187 temporarily stores the empty carrier 101 in a case where a supply amount from the empty carrier conveying line 152 is large.

The empty carrier 101 goes straight through empty carrier convey-out line 187 or is conveyed via the buffer line. Similar to the specimen carrier convey-out line 182a, the empty carrier convey-out line 187 includes a sensor (not shown) in the vicinity of the predetermined barcode reading position. The sensor reads the carrier ID from the barcode of the empty carrier 101. The external connecting module 180a transmits the carrier ID to the host computer 190. At this time, the external connecting module 180a notifies the host computer 190 that the empty carrier 101 has been conveyed out to the external device 210. The host computer 190 can update the increasing and decreasing number of carriers using the notification information. In addition, in a case where the empty carrier 101 is full at the buffer line, the external connecting module 180a returns the empty carrier 101 to the empty carrier conveying line 152 on the downstream side via the relay line 188 and the empty carrier convey-in line 189.

Next, a case where the empty carrier 101 is conveyed into the specimen inspection automation system 100 from the external device 210 via the external connecting module 180a will be described. The empty carrier convey-in line 189 receives the empty carrier 101 from the external device 210. Similar to the specimen carrier convey-in line 185, the empty carrier convey-in line 189 includes a sensor (not illustrated) in the vicinity of the predetermined barcode reading position. The sensor reads the carrier ID from the barcode of the empty carrier 101. The external connecting module 180a transmits the carrier ID to the host computer 190. At this time, the external connecting module 180a notifies the host computer 190 that the empty carrier 101 has been conveyed into the external device 210. The host computer 190 can update the increasing and decreasing number of carriers using the notification information.

Next, various types of information managed by the host computer 190 will be described. In addition, in the following description, the information used in the embodiment is expressed as a table structure, but the information may not necessarily be expressed by a data structure based on a table.

In order to illustrate that the information is not dependent on the data structure, the table described hereinafter may be simply referred to as "information".

FIG. 3 is an example of a carrier increase and decrease table managed by the host computer 190. A carrier increase and decrease table 300 manages the increasing and decreasing number of carriers between each of the external devices 210, 220, and 230 and each of the external connecting modules 180*a*, 180*b*, and 180*c*, and the increasing and decreasing number of carriers of the entire system of specimen inspection automation system 100. In the example of FIG. 3, the external connections 1, 2, and 3 correspond to the external devices 210, 220, and 230, respectively.

The increasing and decreasing number of carriers in the carrier increase and decrease table 300 represents the increasing and decreasing number of carriers based on the time point at which a reset operation is completed. Details of the reset operation will be described later. For example, the increasing and decreasing number of carriers in the carrier increase and decrease table 300 represents the number of times of increase and decrease by a numerical value setting the time point at which the reset operation is completed as "0".

In addition, in the present example, a configuration for managing the conveying of the carrier 101 using the increasing and decreasing number of carriers will be described, but the present invention is not limited thereto. By using other types of information related to the number of times of convey-out of the carriers to the external devices 210, 220, and 230 and the number of times of convey-in of the carriers into the system, the conveying of the carrier 101 may be managed.

When receiving the notification from the external connecting modules 180*a*, 180*b*, and 180*c*, the host computer 190 updates the increasing and decreasing number of carriers of the external connections 1, 2, and 3 of the carrier increase and decrease table 300. In the present embodiment, in a case where the carrier (specimen carrier, empty carrier) 101 is conveyed out from the external connecting modules 180*a*, 180*b*, and 180*c* to the external devices 210, 220, and 230, the increasing and decreasing number of carriers decreases by 1. Meanwhile, in a case where a carrier (specimen carrier, empty carrier) 101 is conveyed into the external connecting modules 180*a*, 180*b*, and 180*c* from the external devices 210, 220, and 230, the increasing and decreasing number of carriers increases by 1.

In addition, in the example of FIG. 3, since the specimen inspection automation system 100 is connected to a plurality of external connections 1, 2, and 3 (external devices 210, 220, and 230), the increasing and decreasing number of carriers is managed for each of the external connections 1, 2, and 3. Accordingly, even in a case where different types of external devices are connected, it is possible to perform control according to the characteristics of the device. In the example of FIG. 3, the increasing and decreasing number of carriers in the external connection 1 (external device 210) is −a from the above-described standard.

The system total value in FIG. 3 is the total value of the increasing and decreasing number of carriers of the external connections 1, 2, and 3. By using the system total value, it is possible to control the number of carriers in the entire system. In addition, in the example, the total value of the increasing and decreasing number of carriers of the external connections 1, 2, and 3 is defined as the total system, but the present invention is not limited thereto. For example, the system total value may be defined in consideration of the specimen input number in the specimen input module 110 and the number of empty carriers 101 on the empty carrier conveying line 152.

In addition, in a case where there are a plurality of carrier circulation paths in the specimen inspection automation system 100, in addition to the system total value, the total value in the circulation path may be defined, and the number of carriers may be controlled using the total value in the circulation path.

FIG. 4 is an example of a threshold value table managed by the host computer 190. The threshold value table 400 includes: a carrier convey-in warning threshold value 401 for warning about convey-in of carriers; a carrier convey-in interruption threshold value 402 for interrupting convey-in of carriers; a carrier convey-out warning threshold value 403 for warning about the convey-out of the carrier; a carrier convey-out interruption threshold value 404 for interrupting the convey-out of the carrier; and a priority order 405, as configuration items.

In the example, "interruption" processing is performed as processing for limiting the convey-in and convey-out of the carriers. "Interruption" means stopping of an operation convey-in and convey-out of the carrier. In addition, the processing of limiting convey-in and convey-out of the carriers is not limited thereto. For example, other processing, such as lowering the pace of convey-in and convey-out, may be performed as processing for limiting the convey-in and convey-out of the carriers.

For example, in a case where the increasing and decreasing number of carriers of the external connection 1 in FIG. 3 exceeds the carrier convey-in warning threshold value 401, the display unit of the host computer 190 displays a warning screen which indicates that there are many cases of convey-in of the carrier (specimen carrier, empty carrier) from the external connection 1. In a case where the increasing and decreasing number of carriers of the external connection 1 in FIG. 3 exceeds the carrier convey-in interruption threshold value 402, the host computer 190 instructs the external connecting module 180*a* to interrupt the convey-in of the carrier (specimen carrier, empty carrier). The same processing is performed with respect to the carrier convey-out warning threshold value 403 and the carrier convey-out interruption threshold value 404. In addition, in a case of the system total value, the warning processing and the interruption processing are performed with respect to the convey-in and convey-out of carriers (specimen carrier, empty carrier) between all of the external connections 1, 2 and 3.

The threshold value table 400 manages a threshold value with respect to the increasing and decreasing number of carriers between each of the external connections 1, 2, 3 and a threshold value with respect to the increasing and decreasing number of carriers of the entire system of the specimen inspection automation system 100. As described above, there are the following advantages in managing the threshold values of each of the external connections 1, 2, and 3 and the threshold value of the entire system. In a case where there is a bias in the increasing and decreasing number of carriers between each of the external connections 1, 2 and 3, the threshold value of each of the external connections 1, 2, and 3 may be used. Meanwhile, although there is no bias in the increasing and decreasing number of carriers between each of the external connections 1, 2, and 3, there may be a situation that the system as a whole has more or fewer carriers. By warning or interrupting even in the case, the number of carriers in the entire system can be kept within an appropriate range. In order to perform such control, the absolute value of the threshold value of the entire system is smaller than the absolute value of the total value of the threshold values of the external connections 1, 2 and 3. For example, regarding the carrier convey-in interruption threshold value, the threshold value (=30) of the entire system is set to be smaller than the total value (15+15+15=45) of the threshold value of the external connections 1, 2, and 3.

In a case of interrupting convey-in or convey-out of the entire system, it is considered that requests for convey-out or convey-in from the plurality of external connections 1, 2, and 3 occur simultaneously after cancellation of the interruption. In this case, priority is given to convey-out or convey-in from the high-priority external connections 1, 2, and 3 set in advance. The host computer 190 starts convey-in or convey-out from the external connections 1, 2, and 3 with the high priority order 405 after interrupting convey-in or convey-out in the entire system. It is possible to start convey-in or convey-out of the carriers from the external device with a high priority designated by the operator.

In addition, in a case of the external connections 1, 2 and 3 in which the priority order 405 is set to the same value, a rule in the system, such as (i) prioritizing the specimen carrier 101 which arrived at the convey-in and convey-out position, (ii) setting the specimen carrier 101 inserted into the system in advance, or (iii) alternately performing convey-in or convey-out by the same order module, may be arbitrarily set.

Various settings in the threshold value table 400 can be set to an arbitrary value by the operator using the input unit and the display unit of the host computer 190. In addition, in a case where the specimen inspection automation system 100 has a plurality of carrier circulation paths, in addition to the system total value, each of the parameters may be set for the total value for each of the carrier circulation paths.

Next, control of convey-out of the carriers between the external connecting module 180*a* and the external device 210 for managing the increase and decrease of the specimen carrier 101 in the specimen inspection automation system 100 within a certain range will now be described.

FIG. 5 is an operation flow of the carrier convey-out from the external connecting module 180*a* to the external device 210. As described above, in the present embodiment, the specimen carrier 101 and the empty carrier 101 are conveyed by different conveying lines, but control of the carrier convey-out operation is the same operation, and thus, the flow of FIG. 5 will be described.

The external connecting module 180*a* inquires of the host computer 190 whether the convey-out is possible (S200). The inquiry may be made, for example, at predetermined time intervals.

The host computer 190 compares the increasing and decreasing number of carriers of the external connection 1 of FIG. 3 with the carrier convey-out warning threshold value 403 of the external connection 1 of the threshold value table 400 (S201). In a case where the increasing and decreasing number of carriers of the external connection 1 is smaller than the carrier convey-out warning threshold value 403, the host computer 190 displays the warning screen on the display unit (S202). Meanwhile, in a case where the increasing and decreasing number of carriers of the external connection 1 is equal to or greater than that of the carrier convey-out warning threshold value 403, the host computer 190 instructs the external connecting module 180*a* to perform the carrier convey-out operation (S204).

After step S202, the host computer 190 compares the increasing and decreasing number of carriers of the external connection 1 of FIG. 3 with the carrier convey-out interruption threshold value 404 of the external connection 1 of the threshold value table 400 (S203). In a case where the increasing and decreasing number of carriers of the external connection 1 is smaller than that of the carrier convey-out interruption threshold value 404, the host computer 190 instructs the external connecting module 180*a* to interrupt the convey-out of the carrier (specimen carrier, empty carrier) (S205). Meanwhile, in a case where the increasing and decreasing number of carriers of the external connection 1 is equal to or greater than that of the carrier convey-out interruption threshold value 404, the host computer 190 instructs the external connecting module 180*a* to perform the carrier convey-out operation (S204). In addition, when the carrier is conveyed out as described above, the host computer 190 reduces the increasing and decreasing number of carriers by 1.

FIG. 6 is an operation flow of the carrier convey-in from the external device 210 to the external connecting module 180*a*. As described above, in the present embodiment, the specimen carrier 101 and the empty carrier 101 are conveyed by different conveying lines, but control of the carrier convey-in operation of the carrier is the same operation, and thus, the flow of FIG. 6 will be described.

The host computer 190 compares the increasing and decreasing number of carriers of the external connection 1 of FIG. 3 with the carrier convey-in warning threshold value 401 of the external connection 1 of the threshold value table 400 (S211). In a case where the increasing and decreasing number of carriers of the external connection 1 is greater than the carrier convey-in warning threshold value 401, the host computer 190 displays the warning screen on the display unit (S212). Meanwhile, in a case where the increasing and decreasing number of carriers of the external connection 1 is equal to or less than that of the carrier convey-in warning threshold value 401, the host computer 190 instructs the external connecting module 180*a* to perform the carrier convey-in operation (S214).

After step S212, the host computer 190 compares the increasing and decreasing number of carriers of the external connection 1 of FIG. 3 with the carrier convey-in interruption threshold value 402 of the external connection 1 of the threshold value table 400 (S213). In a case where the increasing and decreasing number of carriers of the external connection 1 is greater than that of the carrier convey-in interruption threshold value 402, the host computer 190 instructs the external connecting module 180*a* to interrupt the convey-in of the carrier (specimen carrier, empty carrier) (S215). Meanwhile, in a case where the increasing and decreasing number of carriers of the external connection 1 is equal to or less than that of the carrier convey-in interruption threshold value 402, the host computer 190 instructs the external connecting module 180*a* to perform the carrier convey-out operation (S214). In addition, when the carrier is conveyed in as described above, the host computer 190 reduces the increasing and decreasing number of carriers by 1.

Next, reset of the specimen inspection automation system 100 including the external connecting modules 180*a*, 180*b*, and 180*c* will be described. FIG. 7 is an example of a flow of a reset operation of the specimen inspection automation system 100.

Here, it is assumed that the external devices 210, 220, and 230 include an empty carrier buffer unit for buffering the empty carriers, and a specimen carrier buffer unit for buffering the specimen carriers.

The external connecting modules 180*a*, 180*b*, and 180*c* repeatedly perform the convey-in operation of the empty carrier 101 until the empty carrier buffer unit in the external devices 210, 220, and 230 becomes empty (S220, S221). The completion of the convey-in operation may be determined by communication with the external devices 210, 220, and 230. As another example, the completion of the convey-in operation may be determined based on the fact that the convey-in of the empty carriers from the external devices 210, 220, and 230 is not performed for a predetermined time-out period or more. In addition, in a case where there is no function for buffering the empty carriers in the external devices 210, 220, and 230, the above-described order may be omitted.

The external connecting modules 180*a*, 180*b*, and 180*c* repeatedly perform the convey-in operation of the specimen carrier 101 until the specimen carrier buffer unit in the external devices 210, 220, and 230 becomes empty (S222, S223). The completion of the convey-in operation may be determined by communication with the external devices 210, 220, and 230. As another example, the completion of the convey-in operation may be determined based on the fact that the convey-in of the empty carriers from the external devices 210, 220, and 230 is not performed for a predetermined time-out period or more. In addition, in a case where there is no function for buffering the specimen carriers in the external devices 210, 220, and 230, the above-described order may be omitted.

The external connecting modules 180*a*, 180*b*, and 180*c* repeatedly perform the convey-out operation of the empty carrier 101 until the empty carrier buffer unit in the external devices 210, 220, and 230 becomes full (S224, S225). The completion of the convey-out operation may be determined by communication with the external devices 210, 220, and 230. As another example, the completion of the convey-out operation may be determined based on the fact that the external devices 210, 220, and 230 do not receive the empty carriers for a predetermined time-out period or more. In addition, in a case where there is no function for buffering the empty carriers in the external devices 210, 220, and 230, the above-described order may be omitted.

According to the above-described order, the empty carriers and the specimen carriers in the external devices 210, 220, and 230 are temporarily conveyed in, and after this, the empty carrier buffer portion is filled with the empty carriers. By the procedure, the number of carriers in the external devices 210, 220, and 230 can be set to a certain value.

In addition, the reset operation may be a method different from the above-described order as long as the order is an order in which the number of carriers in the external connecting modules 180*a*, 180*b*, and 180*c* becomes a certain number.

At the time when the reset operation for setting the number of carriers in the external devices 210, 220, and 230 to a certain value is completed, the information on the increasing and decreasing number of carriers illustrated in FIG. 3 is reset. The host computer 190 sets each number of times of carrier increase and decrease of the carrier increase and decrease table 300 of FIG. 3 as 0 as an initial value (S226). In addition, the initial value is described as 0 in the present embodiment, but a value other than 0 may be set as the initial value. For example, it is considered that the number of carriers in the empty carrier buffer unit in the external devices 210, 220, and 230 is registered as the initial value.

As described above, by performing the reset operation so that the number of carriers in the external devices 210, 220, and 230 becomes a certain number, it is possible to appropriately restore even when the carrier increase and decrease information is lost due to the failure.

Next, managing of the number of empty carriers using the carrier buffer module 160 will be described. The carrier buffer module 160 is a module that stores the empty carriers 101 in order to appropriately maintain the number of empty carriers 101 on the inside of the system 100. The carrier buffer module 160 includes a communication unit that communicates with the host computer 190, and is configured to supply and collect the empty carrier 101 based on the information from the host computer 190.

When the empty carrier on the inside of the system 100 decreases, the carrier buffer module 160 supplies the empty carrier 101 to the empty carrier conveying line 152. On the contrary, in a case where the number of the empty carriers on the inside of the system 100 is large, the carrier buffer module 160 collects the empty carrier 101 from the empty carrier conveying line 152, and stores the empty carrier 101 temporarily.

FIG. 8 is an example of a flow of an operation for compensating for the increase or decrease in number of carriers. Hereinafter, in a case where the carriers are conveyed in and conveyed out between the external devices 210, 220, and 230 and the external connecting modules 180*a*, 180*b*, and 180*c*, the host computer 190 increases or decreases the increasing and decreasing number of carriers of the carrier increase and decrease table 300 by 1.

As an example, the carrier buffer module 160 inquires of the host computer 190 about the increasing and decreasing number of carriers at predetermined time intervals (S230). Here, it is assumed that the host computer 190 returns the increasing and decreasing number of carriers of the entire system to the carrier buffer module 160.

In the carrier buffer module 160, a first threshold value for determining carrier supply and a second threshold value for determining carrier collection are set. The carrier buffer module 160 compares the increasing and decreasing number of carriers of the entire system with the first threshold value (S231). The carrier buffer module 160 supplies the empty carrier 101 to the empty carrier conveying line 152 in a case where the increasing and decreasing number of carriers of the entire system is smaller than the first threshold value (that is, the decreasing number of carriers is greater than a certain reference value) (S232). The carrier buffer module 160 notifies the host computer 190 that the empty carrier 101 has been supplied (S233). At this time, the host computer 190 increases the increasing and decreasing number of carriers of the entire system by 1.

The carrier buffer module 160 compares the increasing and decreasing number of carriers of the entire system with the second threshold value (S234). The carrier buffer module 160 collects and stores the empty carrier 101 from the empty carrier conveying line 152 in a case where the increasing and decreasing number of carriers of the entire system is greater than the second threshold value (that is, the increasing and decreasing number of carriers is greater than a certain reference value) (S235). The carrier buffer module 160 notifies the host computer 190 that the empty carrier 101 has been collected (S236). At this time, the host computer 190 decreases the increasing and decreasing number of carriers of the entire system by 1.

In addition, the empty carrier 101 stored in the carrier buffer module 160 can be reused at the time of carrier supply. In the embodiment, although the carrier buffer module 160 inquires of the host computer 190 about the increasing and decreasing number of carriers, the carrier buffer module 160 manages the increasing and decreasing number of carriers, and the host computer 190 may report the carrier buffer module 160 on the convey-in and convey-out of the carrier.

Next, the operation of the specimen container 102 accommodated in the specimen stocker (external device 210) at the time of re-inspection request will be described. For example, in a case where a request for removing a specimen to be re-inspected is issued from an upper host (not illustrated) to the specimen stocker, the specimen stocker removes the specimen container 102 stored therein and places the specimen container 102 on the empty carrier 101. After this, the specimen stocker conveys the specimen carrier 101 on which the specimen container 102 is mounted into the external connecting module 180*a*. At this time, since the specimen stocker uses the empty carrier 101, a request for supplying the new empty carrier 101 is issued to the external connecting module 180*a*.

The host computer 190 receives the request for supplying the new empty carrier 101 from the external connecting module 180*a* in accordance with the information on the re-inspection request with respect to the specimen. The host computer 190 notifies the carrier buffer module 160 of the number of necessary empty carriers 101 based on the received information. The carrier buffer module 160 supplies the necessary empty carrier 101 to the empty carrier conveying line 152. By supplying the empty carrier 101 to the empty carrier conveying line 152 beforehand, it is possible to prevent a temporary empty carrier shortage state at the specimen stocker. Therefore, it is possible to prevent deterioration of the processing capability of the entire system.

FIG. 9 is an example of a flow of an empty carrier supply operation at the time of a re-inspection request. The carrier buffer module 160 receives a carrier supply instruction from the host computer 190 (S240). Next, the carrier buffer module 160 supplies the empty carrier 101 to the empty carrier conveying line 152 (S241). The carrier buffer module 160 notifies the host computer 190 that the empty carrier 101 has been supplied (S242). At this time, the host computer 190 increases the increasing and decreasing number of carriers of the entire system by 1.

In addition, in the embodiment, the re-inspection request to the specimen accommodated in the specimen stocker is described, but the same control may also be performed regarding the re-inspection request to the specimen accommodated in the storage module 170.

Next, the empty carrier replenishing operation when the specimen container 102 is input from the specimen input module 110 and the specimen input device (external device 230) will be described. With the input of the specimen, the empty carrier 101 in the system is consumed. Therefore, in a case where a large amount of specimen containers is input in the specimen input device, there is a possibility that a shortage of empty carriers 101 occurs. The shortage of the empty carrier 101 results in deterioration in processing capacity of the system. In order to compensate for this, the carrier buffer module 160 supplies the empty carrier 101.

FIG. 10 is an example of a flow of an empty carrier supply operation at the time of inputting the specimen. For example, the host computer 190 counts the specimen input number in the specimen input module 110. The carrier buffer module 160 inquires the host computer 190 about the specimen input number in the specimen input module 110 (S250).

In the carrier buffer module 160, a third threshold value for determining carrier supply and a fourth threshold value for determining carrier collection are set. The carrier buffer module 160 compares the specimen input number with the third threshold value (S251). The carrier buffer module 160 supplies the empty carrier 101 to the empty carrier conveying line 152 in a case where the specimen input number is greater than the third threshold value (S252). The carrier buffer module 160 notifies the host computer 190 that the empty carrier 101 has been supplied (S253). At this time, the host computer 190 increases the increasing and decreasing number of carriers of the entire system by 1. In addition, when the specimen container 102 is accommodated in the storage module 170, the host computer 190 reduces the specimen input number.

The carrier buffer module 160 compares the specimen input number with the fourth threshold value (S254). In addition, the carrier buffer module 160 collects and stores the empty carrier 101 from the empty carrier conveying line 152 in a case where the specimen input number is smaller than the fourth threshold value (S255). The carrier buffer module 160 notifies the host computer 190 that the empty carrier 101 has been collected (S256). At this time, the host computer 190 decreases the increasing and decreasing number of carriers of the entire system by 1.

In FIG. 10, the supply of the empty carrier 101 in accordance with the specimen input number in the specimen input module 110 has been described, but similar processing may also be performed with respect to other devices, such as the specimen input device.

In addition, in a case where it is ascertained that a large amount of specimen is input at a specific time in advance, the carrier buffer module 160 supplies the empty carrier 101, and it is possible to prevent the shortage of the empty carrier 101. Accordingly, it is possible to prevent deterioration of the processing capability of the entire system. This is effective when a predetermined number or more of the specimens or the like of hospitalized patients are expected to be input at a certain time.

FIG. 11 is an example of a flow of an on-time supply operation of carriers. The host computer 190 manages the time table. In the timetable, planned specimen input date and time and planned specimen input number are registered.

At the registered time, the host computer 190 issues an instruction to supply the empty carrier 101 to the carrier buffer module 160. The carrier buffer module 160 receives the instruction from the host computer 190 (S260). In addition, the carrier buffer module 160 supplies the empty carrier 101 (S261). The carrier buffer module 160 notifies the host computer 190 that the empty carrier 101 has been supplied (S262). At this time, the host computer 190 increases the increasing and decreasing number of carriers of the entire system by 1.

The host computer 190 waits for a predetermined time (S263). The host computer 190 counts the specimen input number in various devices. After a lapse of a predetermined time, the host computer compares the specimen input number during the counting with the planned specimen input number registered in the time table (S264). In a case where the specimen input number is smaller than the planned specimen input number, the host computer instructs the carrier buffer module 160 to collect the empty carrier 101. The carrier buffer module 160 receives the instruction from the host computer 190 (S265). In addition, the carrier buffer module 160 collects the empty carrier 101 (S266). The carrier buffer module 160 notifies the host computer 190 that the empty carrier 101 has been collected (S267). At this time, the host computer 190 decreases the increasing and decreasing number of carriers of the entire system by 1.

Next, effects of the above-described embodiment will be described. In the related art, in a system in which the carriers are circulated and the carrier is delivered to and from the external device, there is a concern that the carrier is deviated toward the inside of the system or the external device. In a case where the number of carriers is deviated, supply of the empty carriers to the part where the empty carriers are necessary is delayed, and the processing speed of the system decreases. In addition, congestion may occur due to concentration of the carriers at a specific site, and there is a concern that the processing speed of the system decreases. According to the above-described embodiment, in a system in which the carriers are circulated and the carrier is delivered to and from the external device, it is possible to avoid the lack or excessive number of carriers in the system without providing a complicated mechanism. As a result, it is possible to prevent deterioration of the processing speed of the system.

In addition, according to the above-described embodiment, the empty carrier 101 and the specimen carrier 101 are conveyed on different conveying lines, and the increasing and decreasing number of carriers is managed between each of the external device 210, 220, and 230 and between the entire system. Therefore, it is possible to prevent congestion from occurring in the conveying line. In addition, it is possible to construct a system with high processing speed.

The present invention is not limited to the embodiments described above, but includes various modification examples. The above-described embodiments have been described in detail in order to make the present invention easy to understand, and are not necessarily limited to those having all the described configurations. In addition, a part of the configuration of a certain embodiment can also be replaced by the configuration of another embodiment. In addition, the configuration of another embodiment can also be added to the configuration of a certain embodiment. In addition, with respect to a part of the configuration of each of the embodiments, other configurations can be added, deleted, or replaced.

In addition, each of the above-described configurations, functions, processing units, processing means, and the like may be realized in hardware by designing a part or all of these, for example, by an integrated circuit. In addition, each of the above-described configurations, functions, and the like may be realized by software by interpreting and executing a program by which the processor realizes each function. Information, such as a program, a table, or a file, for realizing each function can be stored in a memory, a recording device, such as a hard disk, a solid state drive (SSD), or a recording medium, such as an IC card, an SD card, and a DVD.

In the above-described embodiments, a control line or an information line indicates elements considered to be necessary for the description, and all of the control lines and information lines are not limited to the lines which are necessary for the product. All of the configurations may be connected to each other.

REFERENCE SIGNS LIST

100: SPECIMEN INSPECTION AUTOMATION SYSTEM
101: CARRIER, EMPTY CARRIER, SPECIMEN CARRIER
102: SPECIMEN CONTAINER
110: SPECIMEN INPUT MODULE
120: CENTRIFUGAL MODULE
130: UNPLUGGING MODULE
140: DISPENSING MODULE
150: CONVEYING LINE
151: SPECIMEN CONVEYING LINE
152: EMPTY CARRIER CONVEYING LINE
160: CARRIER BUFFER MODULE
170: STORAGE MODULE
180a to 180c: EXTERNAL CONNECTING MODULE
190: HOST COMPUTER
210: EXTERNAL DEVICE (SPECIMEN STOCKER)
220: EXTERNAL DEVICE (AUTOMATIC ANALYZER)
230: EXTERNAL DEVICE (SPECIMEN INPUT DEVICE)
300: CARRIER INCREASE AND DECREASE TABLE
400: THRESHOLD VALUE TABLE

The invention claimed is:

1. A specimen inspection automation system, comprising:
a processing unit which processes a specimen;
a conveying line which conveys carriers, and includes a specimen conveying line for conveying specimen carriers and an empty carrier conveying line for conveying empty carriers;
a control device which controls the conveying of the carriers;
an external connecting module which delivers the carriers to and from an external device,
a carrier buffer module which collects and stores the empty carriers from the empty carrier conveying line and supplies the empty carriers to the empty carrier conveying line, based on information from the control device,
wherein the carrier buffer module keeps the number of empty carriers in the specimen inspection automation system within a certain range based on the number of times of convey-in and convey-out of carriers in the external connecting module.

2. The specimen inspection automation system according to claim 1,
wherein the control device restricts convey-in or convey-out of the carrier in the external connecting module by comparing the number of times of convey-in and convey-out with a threshold value.

3. The specimen inspection automation system according to claim 2,
wherein the control device starts convey-in or convey-out of the carriers based on priority after restricting the convey-in or convey-out of the carriers.

4. The specimen inspection automation system according to claim 2, comprising:
a plurality of the external devices,
wherein, in the control device, a threshold value for each of the external devices and a threshold value of the entire system are set, and an absolute value of the threshold value of the entire system is smaller than an absolute value of the sum of the threshold values for each of the external devices.

5. The specimen inspection automation system according to claim 1,
wherein the carrier buffer module supplies the empty carriers to the conveying line or collects the empty carriers from the conveying line by comparing the number of times of convey-in and convey-out with a threshold value.

6. The specimen inspection automation system according to claim 1, wherein the carrier buffer module supplies the empty carriers to the conveying line in accordance with information on a request for re-inspection of the specimen.

7. The specimen inspection automation system according to claim 1,
wherein the carrier buffer module supplies the empty carriers to the conveying line or collects the empty carriers from the conveying line in accordance with the number of specimens input in the processing unit.

8. The specimen inspection automation system according to claim 1,
wherein the number of times of convey-in and convey-out is the number of increase and decrease of the carriers between the external connecting module and the external device based on a certain point of time.

* * * * *